Feb. 4, 1958 J. C. PRICE 2,822,522

ELECTRIC PULSE MODULATORS

Filed May 12, 1955 2 Sheets-Sheet 1

Inventor
J. C. PRICE
By [signature]
Attorney

*Inventor*
J. C. PRICE
*By* [signature]
*Attorney*

United States Patent Office 2,822,522

Patented Feb. 4, 1958

2,822,522

ELECTRIC PULSE MODULATORS

John Clifford Price, Aldwych, London, England, assignor to International Standard Electric Corporation, New York, N. Y., a corporation of Delaware

Application May 12, 1955, Serial No. 507,961

Claims priority, application Great Britain June 8, 1954

12 Claims. (Cl. 332—9)

The present invention relates to pulse modulators for electric pulse time modulation systems of communication.

The specification of co-pending application Serial No. 441,055, filed July 2, 1954, describes an electric pulse generator employing a crystal triode in which the duration of the generated pulses is substantially equal to half the oscillation period of a resonant positive feedback circuit connecting the emitter and collector electrodes of the crystal triode.

The operation of this arrangement is believed to depend on the current gain of the crystal triode which results from the supply of minority current carriers (which are positive holes in the case where an N-type semiconductor, such as germanium, is used for the crystal triode) from the emitter electrode to the semiconductor, which current carriers are collected by the collector electrode.

We have found that sometimes the duration of the pulses generated by the circuit is greater than that determined by the resonant circuit. The reason for this is believed to be that after the supply of minority carriers from the emitter electrode has been cut off (which usually determines the termination of the pulse), the stored carriers are still available for collection by the collector electrode and the collector current is thus maintained for an abnormally long period.

Whatever may be the explanation of this effect, we have discovered that when a crystal triode has a high current gain, the increase in collector current which results from the unblocking of a crystal triode generally persists for a period after it is blocked again, and the length of the period of persistence depends on the potential of the collector electrode when the crystal triode is unblocked.

The object of the present invention is to take advantage of this phenomenon for generating pulses of controllable duration. In particular, the arrangement may be conveniently adapted as a pulse duration modulator, and by differentiating the duration modulated pulses, short time-position-modulated pulses may be obtained.

In this specification the term "minority current carriers" means carriers additional to the principal carriers to which the conductivity of the semiconductor is chiefly due, such additional carriers being supplied to, or generated in, the semiconductor.

The above stated object is achieved according to the invention by providing a circuit for generating an electric pulse of controllable duration comprising an initially blocked crystal triode having emitter, collector and base electrodes in contact with a semiconductor body, and being of the kind in which, if the emitter contact is unblocked for a period after being initially blocked, the resulting increase in collector current persists after the end of the said period, means for unblocking the crystal triode for a given period, means for varying the potential of the collector electrode during the period of increase of the collector current in such manner as to vary the time during which the increase persists, and means for deriving an output pulse from the collector electrode.

The invention also provides a circuit for generating an electric pulse of controllable duration comprising a crystal triode having emitter, collector and base electrodes in contact with a semiconductor body, the crystal triode being such that the mean current gain (alpha) exceeds 5 over the range of emitter currents from zero to ½ milliampere, means for initially blocking the crystal triode, means for unblocking the crystal triode for a specified period whereby the collector current is increased, means for varying the potential of the collector electrode in such manner as to vary the period during which the increase of collector current persists, and means for deriving an output pulse from the collector electrode.

The invention further provides a trigger circuit for generating an electric pulse of controllable duration, comprising an initially blocked crystal triode having emitter, collector, and base electrodes in contact with a semiconductor body, and being of the kind in which appreciable storage of minority current carriers occurs in the semiconductor body, a positive feedback connection between the collector and emitter circuits, means for unblocking the crystal triode whereby minority current carriers are fed to the semiconductor body and are collected by the collector electrode, means for varying the time taken for the collection of the stored minority carriers, whereby the resulting delay in the return of the crystal triode to the initial blocked condition is correspondingly varied, and means for deriving the generated electric pulse from the collector electrode.

The invention will be described with reference to the accompanying drawings, in which.

Figure 1:
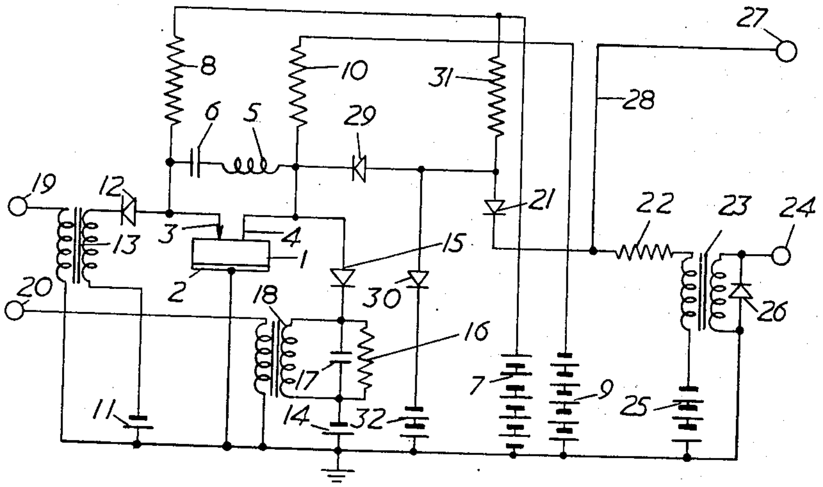
Fig. 1 shows a schematic circuit diagram of an embodiment of the invention.

The pulse modulator circuit shown in Fig. 1 is basically similar to the circuit described in the prior specification already referred to above. It comprises a crystal triode 1 having a base electrode 2, an emitter electrode 3, and a collector electrode 4. The emitter electrode is distinguished from the collector electrode by an arrowhead. It will be assumed that the body of the crystal triode is composed of N-type germanium. The emitter and collector electrodes are coupled by a resonant positive feedback circuit comprising an inductor 5 connected in series with a capacitor 6. A number of direct current sources are provided for operating the circuit. These sources all have one terminal connected to ground, and will be called "positive" or "negative" sources, according as the other terminal is positive or negative. The emitter electrode 3 is connected to a positive source 7 through a load resistor 8, and the collector electrode is connected to a negative source 9 through a load resistor 10. The resistor 10 in series with the collector electrode should be fairly large; for example, several thousand ohms. The sources 7 and 9 may have potentials of 48 volts, for example. The base electrode 2 is connected directly to ground.

The emitter electrode 3 is connected to a negative source 11 of potential about 1½ volts, for example, through a rectifier 12 and the secondary winding of an input transformer 13. The rectifier 12 should be directed so that it will normally be unblocked. The collector electrode is connected to a negative source 14 of potential about 2 volts through a rectifier 15 and a resistor 16 shunted by a capacitor 17. The rectifier 15 should be directed so that it will normally be blocked. The secondary winding of a second input transformer 18 is connected across the capacitor 17.

It will be noted that the potential of the emitter electrode 3 with respect to the base electrode 2 will be about −1½ volts, so the emitter current is cut off, and the collector current is accordingly very small. The collector potential will accordingly have a relatively large negative value; for example about −40 volts.

A train of short regularly repeated trigger pulses is applied to terminal 19 connected to the primary winding of the input transformer 13. This transformer should be so connected that the trigger pulses appear in the secondary winding as positive pulses applied to the rectifier 12 with an amplitude of about 2½ volts. The trigger pulses may, for example, be generated by means of a crystal triode circuit similar to Fig. 1 of the specification already referred to, and their repetition period may, for example, be about 24 microseconds.

The trigger pulses are of sufficient amplitude to overcome the bias source 11 and to drive the emitter electrode 3 slightly positive to the base electrode 2, thereby unblocking the emitter contact. The crystal triode 1 then becomes unblocked, and generates a positive pulse at the collector electrode in the manner fully explained in the aforesaid specification. The potential of the collector electrode rises from about −40 volts to that of the source 14 (about −2 volts) at which value it is held by the unblocking of the rectifier 15.

If there is no appreciable storage of positive holes, then the duration of the pulse generated by the collector electrode 4 will be substantially half the period of resonance of the elements 5 and 6, because this period determines the instant at which the emitter contact is again blocked, thus cutting off the supply of positive holes. However, if the crystal triode is of the kind in which positive holes are stored in the semi-conductor material, these stored holes will be available for maintaining the collector current after the supply from the emitter electrode 3 is cut off, and the duration of the generated pulse will be increased by the time taken to collect the stored holes. This time depends on the potential acquired by the collector electrode when the crystal triode is fully unblocked.

Accordingly, if a modulating wave, such as a speech wave, be applied at terminal 20 connected to the primary winding of the input transformer 18, the potential applied to the lower terminal of the rectifier 15 will be varied accordingly. Thus the limiting value which the potential of the collector electrode can reach is varied similarly, and so also the time taken to collect the stored positive holes. Thus the trailing edges of the pulses generated by the collector electrode 4 will be time modulated in accordance with the signal voltage applied at terminal 20.

The capacitor 17 should be relatively large, so that the charge stored therein will maintain the potential applied to the rectifier 15 substantially constant during the generation of the pulse at the collector electrode 4.

The positive duration-modulated pulses generated by the collector electrode are supplied through a rectifier 21 and a load resistor 22 to the primary winding of an output transformer 23, the secondary winding of which has one end connected to an output terminal 24, and the other end to ground. The lower end of the primary winding is connected to a negative source 25, which may, for example, have a potential of 11 volts. The transformer acts to differentiate the duration-modulated pulses and it will be assumed that it is so connected that the differential pulses corresponding to the trailing edge are positive. A rectifier 26 shunts the secondary winding and is directed to suppress the negative differential pulses corresponding to the leading edges of the duration-modulated pulses.

If it is desired to make use of the duration-modulated pulses without differentiation, an output terminal 27 connected over a conductor 28 to the junction point of elements 21 and 22 may be used, and the transformer 23 may be omitted.

In order to remove the unwanted lower portions of the generated pulses, and to ensure that the duration-modulated pulses shall have a fixed amplitude, a limiting arrangement is provided including the rectifiers 21, 29 and 30. The upper terminal of the rectifier 21 is connected to the source 7 through a resistor 31, and to the collector electrode 4 through the rectifier 29. It is also connected to a negative source 32 through the rectifier 30 and to the negative source 25 through the rectifier 21 and the load resistor 22. The source 32 may have potential of 3½ volts.

During the intervals between pulses, the collector electrode 4 is at a potential below that of either of the sources 25 or 32, so that the rectifier 29 is unblocked, and rectifiers 21 and 30 are blocked. Thus the potential of the conductor 28 is that of the source 25, namely −11 volts.

When a trigger pluse arrives at terminal 19, the potential of the collector electrode 4 rises, as already explained, to the potential at which the rectifier 15 becomes unblocked. This exceeds the potential of the source 25, so that the rectifier 29 is blocked and rectifiers 21 and 30 are unblocked. The potential of the conductor 28 then assumes that of the source 32, namely −3½ volts. Thus the amplitude of the generated pulses is limited between −11 and −3½ volts.

With the particular values suggested for the potentials of the sources 14 and 32, the maximum amplitude of the modulating signal wave appearing in the secondary winding of the input transformer 18 should be limited to something less than ±2 volts. In practice a closer limitation is desirable if a substantially linear relation between the signal wave amplitude and the time excursions of the short differential pulses obtained from terminal 24 is required.

In a particular example of Fig. 1, the elements had the following values:

| | | |
|---|---|---|
| Resistor 8 | ohms | 27,000 |
| Resistor 10 | do | 4,700 |
| Resistor 16 | do | 680 |
| Resistor 31 | do | 25,000 |
| Resistor 22 | do | 3,500 |
| Capacitor 6 | microfarads | 0.00047 |
| Capacitor 17 | do | 0.04 |
| Inductor 5 | henries | 0.00074 |

Impedance presented by secondary winding of

| | | |
|---|---|---|
| Transformer 18 | ohms | 600 |
| Source 7 | volts | 48 |
| Source 9 | do | 48 |
| Source 11 | do | 1½ |
| Source 14 | do | 2 |
| Source 25 | do | 11 |
| Source 32 | do | 3½ |

Figure 2:
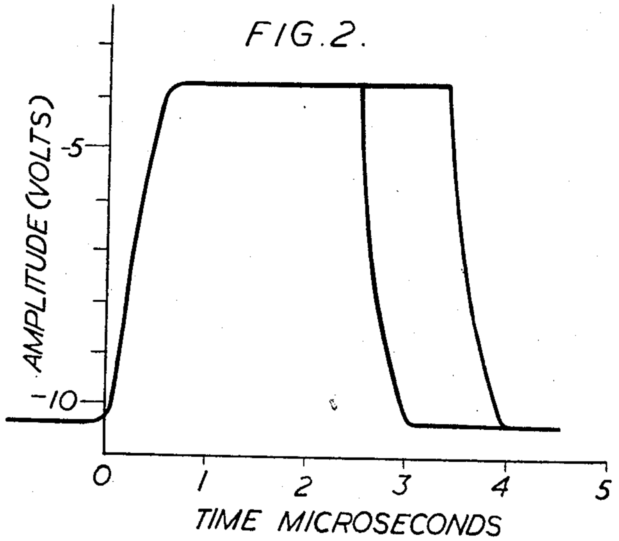
Figs. 2 and 3 show graphical diagrams illustrating the performance of Fig. 1.
Figure 3:
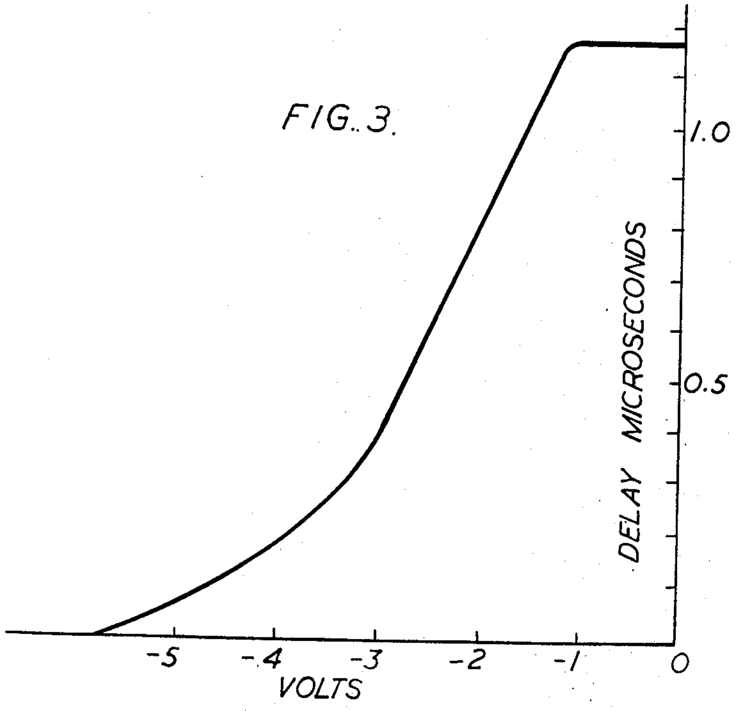

Fig. 2 shows the amplitude of the duration-modulated pulse obtained from terminal 27 plotted against time for this particular case, with the maximum and minimum time excursion of the trailing edge corresponding to a range of modulating voltage applied to the rectifier 15 of −2 volts±0.75 volt, over which range the response is substantially linear. It will be noted that the corresponding time excursion is over a total range of about 0.7 microsecond. Fig. 3 shows the relation between the delay of the trailing edge of the pulse of Fig. 2, measured from an arbitrary zero, and the potential applied to the rectifier 15. It will be noted that the relation is substantially linear over the range −2±0.75 volt.

Figure 4:
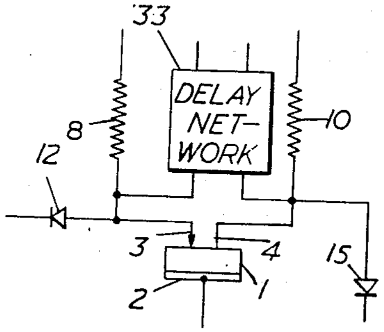
Fig. 4 shows a modification of part of Fig. 1.

In order to increase the percentage modulation, the duration of the pulses generated by the collector electrode may be reduced. In that case the circuit of Fig. 1 is preferably slightly modified by replacing the inductor 5 and capacitor 6 by an open circuited delay network 33 as shown in Fig. 4, which only includes the elements connected to the emitter and collector electrodes of the crystal triode. The delay network 33 may have a characteristic impedance of about 1000 ohms, and a delay of 0.4 microsecond, for example, whereby the duration of the output pulse will be about 0.8 microsecond.

It was stated above that the crystal triode 1 of Fig. 1 should be of the type in which appreciable storage of minority carriers occurs. It has been found, for example, that if N-type germanium is used, the crystal triode will be satisfactory for the purpose of the invention if it has a mean current gain (known as "alpha") exceeding 5 when measured with emitter current between zero and ½ milliamp., the collector electrode being polarised 20 volts negatively to the base electrode. In other words, high positive hole storage is associated with high initial current gain.

It may be added that best results have so far been obtained by using for the semiconductor a germanium crystal having N-type conductivity derived substantially entirely from the addition of antimony in such percentage that the resistivity produced is between 4 and 6 ohm-cm.

It has further been found that the storage effect of the positive holes is associated chiefly with the collector electrode contact system, and it is well known that in order to produce a good crystal triode of the catswhisker type it is necessary to apply an appropriate electroforming process to the collector electrode. This leads to an alternative method of testing a crystal triode for storage properties. It has been found that if the applied alternating potential necessary to provide a given rectified current in a circuit of given resistance is measured at increasing frequencies, a sharp increase in potential occurs at a frequency of about 50 kilocycles per second (corresponding to a sharp fall in rectifying efficiency) in the case of crystal triodes in which appreciable storage of the positive holes is present. It may be stated that a crystal triode would be suitable for the purposes of the present invention if the rectifying efficiency at 70 kilocycles per second, measured in the manner described above, is at least 3 decibels below that at low frequencies.

While all the polarising sources have been shown in Fig. 1 for clearness in the form of separate batteries, it will be understood that any suitable type of direct current sources may be used, and they need not all be separate from one another.

Although the arrangement described is believed to depend for its action on storage of minority carriers, it has not been found that the frequency of operation is seriously limited on this account. The variations in the timing of the trailing edge of a generated pulse do not affect appreciably the time of occurrence of the leading edge of the following pulse, and accordingly when the arrangement is used as a pulse time modulator for a multichannel system, no crosstalk of any importance is introduced. The arrangement has been used satisfactorily with modulating frequencies up to about 20 kilocycles per second.

It may be pointed out that the duration modulated pulses produced by the arrangements described can easily be obtained with relatively large amplitude, and accordingly time-position-modulated pulses of sufficient power can be derived by differentiation without further amplification.

It should be mentioned that the crystal triode shown in Fig. 1 need not be arranged as a trigger circuit, but the elements 5, 6 could be omitted and the crystal triode arranged as a simple amplifier with the emitter contact normally blocked. If a train of unblocking pulses of suitable duration are applied to terminal 19, the duration of the corresponding output pulses derived from the collector electrode will in general be increased by the persistence effect attributed to the storage of the minority carriers, and the durations of these output pulses will be modulated as described above by the signal wave applied to terminal 20.

While the principles of the invention have been described above in connection with specific embodiments, and particular modifications thereof, it is to be clearly understood that this description is made only by way of example and not as a limitation on the scope of the invention.

What we claim is:

1. A circuit for generating an electric pulse of controllable duration comprising an initially blocked crystal triode having emitter, collector and base electrodes in contact with a semiconductor body, and being of the kind in which, if the emitter contact is unblocked for a period after being initially blocked, the resulting increase in collector current persists after the end of the said period before the crystal reverts to its blocked stage, said persistence depending upon the intensity of the unblocking, means for unblocking the crystal triode for a given period at a given intensity to produce an increase in collector current, means for varying the potential of the collector electrode during the period of increase of the collector current to correspondingly vary the intensity of said unblocking and thus to vary the time during which the increase persists, and means for deriving an output pulse from the collector electrode.

2. A circuit for generating an electric pulse of controllable duration comprising a crystal triode having emitter, collector and base electrodes in contact with a semiconductor body, the crystal triode being such that the mean current gain exceeds 5 over the range of emitter currents from zero to ½ milliampere, means for initially blocking the crystal triode, means for unblocking the crystal triode for a specified period at a predetermined intensity whereby the collector current is increased, means for varying the potential of the collector electrode to correspondingly vary the intensity of said unblocking and thus to vary the period during which the increase of collector current persists, and means for deriving an output pulse from the collector electrode.

3. A trigger circuit according to claim 2 further comprising a positive feedback connection between the collector and emitter electrodes, arranged substantially to determine the minimum period during which the crystal triode is unblocked, said means for varying comprising means for limiting the potential of the collector electrode when the crystal triode is fully unblocked and means for varying the potential limit in accordance with the amplitude of said varied potential applied to said collector.

4. A trigger circuit for generating an electric pulse of controllable duration, comprising an initially blocked crystal triode having emitter, collector, and base electrodes in contact with a semiconductor body, and being of the kind in which appreciable storage of minority current carriers occurs in the semiconductor body whereby current persists after unblocking and reblocking dependent upon the effective amplitude of the unblocking voltage, a positive feedback connection between said collector and emitter electrodes preventing return to blocked condition during the period of current flow from said collector, means for applying an unblocking voltage of a predetermined duration to the crystal triode whereby minority current carriers are fed to the semi-conductor body and are collected by the collector electrode, means for varying the amplitude of the unblocking voltage whereby the resulting delay in the return of the crystal triode to the initial blocked condition is correspondingly varied, and means for deriving the generated electric pulse from the collector electrode.

5. A trigger circuit for generating a train of electric pulses of controllable duration, comprising an initially blocked crystal triode having emitter, collector, and base electrodes in contact with a body of N-type semiconductor material, the crystal triode being of the kind in which appreciable storage of positive holes occurs in the said body whereby current persists after unblocking and reblocking dependent upon the effective amplitude of the unblocking voltage, a positive feedback connection between the emitter and collector electrodes designed to determine the minimum period of unblocking of said crystal permitting return to initial blocked condition, means for periodically applying an unblocking voltage to the crystal triode whereby positive holes are supplied to the said body from the emitter electrode and are collected by the collector electrode, means for limiting the potential acquired by the collector electrode when the crystal triode is fully unblocked, means for varying the limiting potential of the collector electrode whereby the effective amplitude of the unblocking voltage is correspondingly varied and the time taken for the collection of the positive holes and the resulting delay in the return of the crystal triode to the initial blocked condition after each unblocking are correspondingly varied, and means for deriving the train of electric pulses from the collector electrode.

6. A circuit according to claim 3 further comprising means for applying a blocking potential between the emitter and base electrodes to maintain the crystal triode initially blocked, and means for applying a train of regularly repeated unblocking pulses to the said emitter electrode.

7. A circuit according to claim 3, further comprising means for limiting the amplitude of the generated pulses between specified potentials.

8. A circuit according to claim 3, in which the said positive feedback connection comprises a series resonant circuit.

9. A circuit according to claim 3, in which the said positive feedback connection comprises a delay network open-circuited at one end.

10. A circuit according to claim 3 in which the said means for varying the limiting potential of the collector electrode comprises a source of a modulating signal wave.

11. A circuit according to claim 10 in which the means limiting potential for the collector electrode comprises a rectifier directed so that it will be held blocked when the crystal triode is blocked, a direct current source having its positive terminal connected to the base electrode of the crystal triode, and its negative terminal connected through the said source of a modulating signal wave and said rectifier to the collector electrode.

12. A circuit according to claim 3 further comprising means for differentiating the generated pulses and means for suppressing the differential pulses corresponding to the leading edges of the said generated pulses.

References Cited in the file of this patent

UNITED STATES PATENTS

| | | |
|---|---|---|
| 2,644,895 | Lo | July 7, 1953 |
| 2,644,925 | Koros | July 7, 1953 |
| 2,705,287 | Lo | Mar. 29, 1955 |